(12) United States Patent
Chien et al.

(10) Patent No.: US 9,085,730 B2
(45) Date of Patent: *Jul. 21, 2015

(54) LIQUID CRYSTAL COMPOSITION AND DEVICE THEREOF

(75) Inventors: Liang-Chy Chien, Hudson, OH (US); Lu Lu, Kent, OH (US); Jeoung Yeon Hwang, Kent, OH (US)

(73) Assignee: Kent State University, Kent, OH (US)

( * ) Notice: Subject to any disclaimer, the term of this patent is extended or adjusted under 35 U.S.C. 154(b) by 750 days.

This patent is subject to a terminal disclaimer.

(21) Appl. No.: 12/802,903

(22) Filed: Jun. 16, 2010

(65) Prior Publication Data

US 2011/0007260 A1    Jan. 13, 2011

Related U.S. Application Data

(60) Provisional application No. 61/268,742, filed on Jun. 16, 2009.

(51) Int. Cl.

| | |
|---|---|
| *C09K 19/52* | (2006.01) |
| *C09K 19/18* | (2006.01) |
| *C09K 19/54* | (2006.01) |
| *C09K 19/12* | (2006.01) |
| *G02F 1/1333* | (2006.01) |
| *G02F 1/1343* | (2006.01) |
| *C09K 19/58* | (2006.01) |
| *C09K 19/02* | (2006.01) |

(52) U.S. Cl.
CPC .............. *C09K 19/18* (2013.01); *C09K 19/02* (2013.01); *C09K 19/586* (2013.01); *C09K 19/588* (2013.01); *C09K 19/0275* (2013.01); *G02F 1/1333* (2013.01); *G02F 1/133371* (2013.01); *G02F 1/134336* (2013.01)

(58) Field of Classification Search
CPC .... C09K 19/0275; C09K 19/18; C09K 19/42; C09K 19/586; C09K 2019/183; C09K 2219/03; G02F 1/1333; G02F 1/133371; G02F 1/134336
USPC ............ 428/1.1; 252/299.01, 299.6; 349/139, 349/186

See application file for complete search history.

(56) References Cited

U.S. PATENT DOCUMENTS

| 4,818,076 | A  | * | 4/1989 | Heppke et al. ................ 349/167 |
| 7,474,373 | B2 | * | 1/2009 | Miyachi et al. ............... 349/129 |
| 2008/0106689 | A1 | * | 5/2008 | Inoue et al. ................... 349/181 |
| 2010/0039589 | A1 | * | 2/2010 | Shibahara ....................... 349/96 |
| 2010/0315585 | A1 | * | 12/2010 | Chien et al. .................... 349/201 |

FOREIGN PATENT DOCUMENTS

WO    WO 2007034600 A1  *  3/2007

OTHER PUBLICATIONS

Harry J. Coles and Mikhail N. Pivnenko, "Liquid crystal 'blue phases' with a wide temperature range," *Nature*, Aug. 18, 2005, pp. 997-1000, vol. 436, Nature Publishing Group.

Hirotsugu Kikuchi, Masayuki Yokota, Yoshiaki Hisakado, Huai Yang and Tisato Kajiyama, "Polymer-stabilized liquid crystal blue phases," *Nature Materials*, Sep. 2002, pp. 64-68, vol. 1, Nature Publishing Group.

Zhibing Ge, Sebastian Gauza, Meizi Jiao, Haiqing Xianyu and Shin-Tson Wu, "Electro-optics of polymer-stabilized blue phase liquid crystal displays," *Applied Physics Letters*, 2009, pp. 101104-1, 101104-2, and 101104-3, vol. 94, American Institute of Physics.

Paul R. Gerber, "Electro-Optical Effects of a Small-Pitch Blue-Phase System," *Mol. Cryst. Liq. Cryst.*, 1985, pp. 197-206, vol. 116, Gordon and Breach, Science Publishers, Inc. and OPA Ltd.

* cited by examiner

*Primary Examiner* — Shean C Wu
(74) *Attorney, Agent, or Firm* — Joseph D. Dreher; Fay Sharpe LLP (57) ABSTRACT

The invention provides a liquid crystal (LC) composition, a LC cell thereof, and a LC device thereof. The LC composition comprises (i) a mixture of two or more nematic liquid crystals, and (ii) at least one chiral dopant. The mixture of the liquid crystals can exist in a blue phase within a temperature range of from about 12-60° C. such as 21-28° C. The LC device can be a blue phase mode liquid crystal display (BPLCD) based on such a room-temperature blue phase LC. The BPLCD requires no alignment, and it exhibits merits such as a fast switching time (e.g. sub-millisecond), a low switching voltage and a large field-induced birefringence, among others.

15 Claims, 13 Drawing Sheets

LIQUID CRYSTAL COMPOSITION AND DEVICE THEREOF

This application claims priority based on the U.S. Provisional Application 61/268,742 filed on Jun. 16, 2009, which is incorporated herein by reference in its entirety.

BACKGROUND OF THE INVENTION

The present invention relates to a liquid crystal (LC) composition, a LC cell thereof, and a LC device thereof. It finds particular application in conjunction with a liquid crystal display, a phase modulator, a beam steering device, a sensor, and a lasing device; and will be described with particular reference thereto. However, it is to be appreciated that the present invention is also amenable to other like applications.

Since liquid crystal displays (LCDs) were used in products from mobile displays to LCD-TVs, a motion picture response time (MPRT) for displaying fast actions has long been sought in the field. Compared to the cathode-ray tube, the motion artifacts observed with video or dynamic picture of several currently available LCD technologies such as S-PVA, S-IPS (in-plane-switching) or OCB LCD are still far from perfect. One of the major factors is related to the slow dynamics of liquid crystal molecular reorientation in response to the field-on and field-off states. One approach to improve the shortcoming of slow dynamics of available LCs is to use an electronic engine to drag the liquid crystal materials. For example, several techniques including scanning backlight, frame rate doubling and black data insertion have been developed recently to improve the hold type blur. In contrast, there is little progress toward the development of fast switching nematic liquid crystal materials that are capable of exhibiting MPRT.

The liquid crystal blue phase is a self-assembled, highly fluidic isotropic medium that possesses three-dimensional periodical structure existing within a narrow temperature range in highly chiral liquid crystals. The blue phase (BP) is believed to have a small double twist structure which is more stable than a single twist structure. The structure of the BP is stabilized by its coexistence with disclination lines. The appearance of blue phases is found in a very narrow temperature range between an isotropic and a cholesteric phase, resulting from the competition between the chiral twisting force and the desire for the molecules to fill a space uniformly. BPs are classified into three categories depending on the double-twist-cylinder packing structure: BPI (body-centered cubic structure), BPII (simple cubic structure) and BPIII (isotropic phase with identical symmetry). The BPs are useful for field-induced birefringence without the need of alignment layers. As such, they are suitable for numerous optical and electro-optical applications.

Zhibing Ge et al. have published an article in APPLIED PHYSICS LETTERS 94, 101104 (2009) with the title of "Electro-optics of polymer-stabilized blue phase liquid crystal displays". In the publication, electro-optics of polymer-stabilized blue phase liquid crystal displays BP LCDs are analyzed and validated experimentally. Zhibing Ge et al. has developed a numerical model for characterizing and optimizing the electro-optical and display properties of BP LCDs in in-plane switching and fringe field switching cells. The simulated voltage-dependent transmittance curves agree well with the measured results. To lower the operating voltage while keeping a high transmittance, both the electrode width and gap, and a large Kerr constant make important contributions. A wide-view BP LCD using a single biaxial compensation film is also simulated in the article.

Recently, fast switching liquid crystal electro-optical devices based on cholesteric blue phase materials have been developed using either polymer stabilization or a nematic bimesogen in preparing the blue phase mixtures. In the case of a polymer stabilized blue phase (PSBP), a polymer network is formed by polymerizing a mixture of isotropic and mesogenic monomers, and the polymer may be localized at the disclination core, maintaining the isotropic state (see H Kikuchi, M Yokota, Y Hisakado, H Yang, and T Kajiyama, "Polymerstabilized liquid crystal blue phases," Nature Mater 1, 64-68 (2002)). The BP of the resulting composite requires a minimum energy to maintain the disclination isotropic core and thus, leads to an increase in the temperature range of the BP phase. With the breakthrough in BP material, a fast switching PSBP LCD-TV has recently been demonstrated; however, the PSBP device requires high voltage switching between the on and off states. On the other hand, a mixture of bimesogens nematic and chiral dopant leads to a broad BP temperature that gives a very narrow band of bright reflection (see H. J. Coles, and M. N. Pivnenko, "Liquid Crystal 'Blue Phases' with a Wide Temperature Range." Nature, 436, 997-1000 (2005)). However, the bimesogen blue phase material shows an electrically-induced cholesteric phase change after the switching from blue phase I (BPI, body-centered cubic structure) to blue phase II (BPII, simple cubic structure). To return to the blue phase, the cell needs to be heated to isotropic temperature and slowly cooled to BP I. Moreover, the mechanism of this switching is field-induced distortion of the cubic lattice of BPI resulting in a change in the reflected light. These and other challenges are strong motivating factors in the development of new BP materials and electro-optical light weight flexible cholesteric displays.

A BP liquid crystal material with a broad temperature range is necessary for creating robust LCDs using BP materials but without polymer stabilization. The most common method to formulate a blue phase liquid crystal (BPLC) is by mixing a highly chiral component with a nematic LC having a broad temperature range. The advantage of this approach is a room-temperature mixture formulation that offers opportunities for process simplicity in the control of BP phase and its electro-optical property; however, it is difficult to find appropriate materials to achieve this goal.

Advantageously, the present invention provides a LC composition, a LC cell thereof, and a LC device thereof that solve the aforementioned problems. For example, the invention provides a fast switching blue phase mode liquid crystal display (BPLCD) based on a room-temperature BPLC using an in-plane-switching (IPS cell) cell. The BPLCD requires no alignment, and it exhibits merits such as a fast switching time (e.g. sub-millisecond), a low switching voltage and a large field-induced birefringence, among others.

BRIEF DESCRIPTION OF THE INVENTION

One aspect of the invention provides a liquid crystal composition comprising (i) a mixture of two or more nematic liquid crystals, and (ii) at least one chiral dopant; wherein the mixture of liquid crystals is in a blue phase.

Another aspect of the invention provides a liquid crystal cell comprising two substrates, and a liquid crystal composition comprising (i) a mixture of two or more nematic liquid crystals, and (ii) at least one chiral dopant; wherein the mixture of liquid crystals is in a blue phase, and the liquid crystal composition is placed between the two substrates.

Still another aspect of the invention provides a liquid crystal device comprising one or more cells as described above.

For example, one substrate of the cell may have inter-digitated electrodes, while the other substrate may have no electrode.

BRIEF DESCRIPTION OF THE DRAWINGS

FIG. 3A-(a) is a photomicrograph showing a BPI structure of a BPLC sample on a microscope slide at room temperature, in accord with an embodiment of the invention;

FIGS. 3A-(b) and 3A-(c) show the distinct textures of a BPLC sample in response to applied voltages of 0 and 80V respectively, in accord with an embodiment of the invention;

DETAILED DESCRIPTION OF THE INVENTION

As known to a skilled artisan in the field, the term "nematic" is intended to describe a common LC phase, in which the molecules have no positional order, but they have long-range orientational order. For example, the molecules may all point in the same direction within a domain. The molecules have fluidity similar to that of ordinary (isotropic) liquids but they can be easily aligned by an external magnetic or electric field.

In various exemplary embodiments, the blue phase of the liquid crystal composition can exist in a temperature range of from about 12° C. to about 60° C., and preferably in a temperature range of from about 21° C. to about 28° C.

In the liquid crystal composition of the present invention, each of the two or more nematic liquid crystals may have a dielectric anisotropy in the range of, for example, from about −10 to about +30, and preferably from about −6 to about +25. It may have an optical birefringence in the range of, for example, from about 0.05 to about 0.5, and preferably from about 0.1 to about 0.3.

In preferred embodiments of the invention, the viscosity of the liquid crystal composition may be controlled in the range of from about 90 mPa·s to about 450 mPa·s, and preferably from about 90 mPa·s to about 250 mPa·s. Any suitable methods may be used to tune the viscosity of the composition, for example, using additives such as MLC 6080, BL006, or the like, or the mixture thereof. In an example of the invention, the additive is nematic in an amount of from 90% to about 40% by weight, based on the total weight of the liquid crystal composition.

In various exemplary embodiments, the nematic liquid crystal used in the invention is selected from the group consisting of an isothiocyanate and fluorinated isothiocyanate LC such as a compound of Formula (A); a high birefringence LC such as BL006; a high dielectric anisotropy LC such as MLC 6080; and a fluorinated LC such as ZLI 4792.

(A)

In Formula (A), R and $R_1$ are the hydrocarbon with carbon number ranging from 1 to 20, such as $C_nH_{2n+1}$ (n=1-20); and m is the repeat unit of phenyl acetylene ranging from 1 to 3 and preferably 1 or 2. $R_1$ is preferably methyl or ethyl. For example, the compound of Formula (A) may be 4-isothiocyanato-3,5-difluoro-4'-pentyl-bis(biphenyl tolane), also known as C5PPTP2FNCS, which has Δn=0.4838 and Δε=+21. Similarly, when m is 2, the compound of Formula (A) is C5P(PTP)$^2$2FNCS.

BL006 is a high birefringence eutectic mixture with a wide nematic phase range available from Merck Chemical Company. ($T_{NI}$=113° C., Δε=+17.3, Δn=0.289). MLC 6080 is a eutectic mixture available from Merck Chemical Company exhibiting a low viscosity, high dielectric anisotropy and wide nematic phase range ($T_{NI}$=85° C., Δε=+7.5, Δn=0.1984). ZLI4792 is a super fluorinated eutectic mixture available from Merck Chemical Company exhibiting moderate values of birefringence (~0.1) and dielectric anisotropic (~+5) and a wide nematic temperature range ($T_{NI}$=92.8° C., Δε=53, Δn=00964).

In preferred embodiments, the nematic LC mixture of the present invention comprises an isothiocyanate and fluorinated isothiocyanate LC and a high birefringence LC. In an example, the nematic LC mixture comprises C5PPTP2FNCS and BL006. The weight ratio between C5PPTP2FNCS and BL006 may be in the range of from about 0.05 to about 99.95, preferably in the range of from about 10 to about 90, and more preferably in the range of from about 20 to about 50.

Any suitable chiral dopant or mixture thereof may be used, together with the nematic LC mixture, in formulating the LC composition of the present invention. For example, the chiral dopant may be selected from the group consisting of CB15, C15, R811, S811, R1011, S1011, and the like, and any combination thereof. Chiral dopants CB15, C15, R811, S811, R1011, S1011 were available from Merck Group and have values of helical twisting power (HTP) of 8, 5, 10, 33, and 33 $\mu m^{-1}$, respectively.

In various embodiments, the nematic LC mixture and the chiral dopant or mixture thereof may have a weight ratio in the range of from about 0.1 to about 0.9, preferably in the range of from about 0.2 to about 0.8, and more preferably in the range of from about 0.3 to about 0.6.

In a specific embodiment, the nematic LC mixture comprises C5PPTP2FNCS and BL006; and the chiral dopant comprises CB15.

Based on the LC composition, the present invention can provide an electro-optical (EO) cell or a liquid crystal cell. The cell generally comprises at least two substrates and the LC composition as described above. The liquid crystal composition is placed between the two substrates. To avoid the introduction of foreign ions into the LC composition and their negative effect on the performance of the LC composition, the LC cell may optionally include a protective layer of polymer securing the LC composition. For example, the protective layer can prevent the diffusion of ions from substrate into the LC composition. As an advantage of the invention, the LC cell does not have to have an alignment layer.

In an embodiment of the invention, the LC cell is an in-plane switching (IPS) cell comprising a pixel electrode and a counter electrode on one of the two substrates. At least a part of the pixel electrode and at least a part of the counter electrode are shaped as inter-digitized parallel bars, and the bars of pixel electrode and the bars of the counter electrode are arranged in an alternative manner. For example, the gap between the two substrates in the IPS cell may be in the range of from about 1 $\mu m$ to about 20 $\mu m$, and preferably in the range of from about 2 $\mu m$ to about 10 $\mu m$. The width of the bars of the counter electrode may be in the range of from about 2 $\mu m$ to about 50 $\mu m$, and preferably in the range of from about 3 $\mu m$ to about 10 $\mu m$. The distance between a bar of the pixel electrode and a neighboring bar of the counter electrode may be in the range of from about 2 $\mu m$ to about 100 $\mu m$, and preferably in the range of from about 3 $\mu m$ to about 50 $\mu m$.

Based on the LC cell, the present invention further provide a LC device such as a liquid crystal display, a phase modulator, a beam steering device, a sensor, and a lasing device. Any suitable methods known to a skilled artisan in the field may be used to make, test, and use these devices.

In an exemplary embodiment, the invention provides a liquid crystal display comprising a blue phase forming liquid crystal and a liquid crystal cell with a pair of substrates. The LC cell has one of the substrates coated with indium-tin-oxide conductive electrodes and is inter-digitally patterned; and the other substrate has no electrodes. A blue phase liquid crystal is formulated with nematic and chiral dopants to achieve a room temperature blue phase and is deposited between a pair of substrates that are separated with spacers to control the cell gap. Applying an electric field across the electrode enables deformation of the optically isotropic liquid crystal medium in a three-dimensional structure and induction of a birefringence. The value of induced birefringence is proportional to the applied voltage and cell structure in addition to the material physical properties. The device can also be built on substrates that are flexible and with patterned structure to provide physical support to the substrates against external stress and mechanical shock.

EXAMPLE 1

Liquid Crystal Compositions

A BPLC is composed of a nematic and a chiral dopant at an appropriate weight concentration of each component. Each room-temperature BPLC of this example comprises a mixture of a nematic liquid crystal and a chiral dopant. The formulations of the BPLC mixtures including a 4-isocyacyanato-3,5-difluoro-4'-pentyl-biphenyl tolane (C5PPTP2FNCS) are summarized in Table 1.

TABLE 1

| Sample # | Nematic LC (NLC) C5PPTP2FNCS/BL006 (%/%) | NLC/CB15 (%/%) |
|---|---|---|
| 1 (base) | 0/100 | 34.9/65.1 |
| 2 | 6.25/93.75 | 34.5/65.5 |
| 3 | 9.20/90.80 | 34.1/65.9 |
| 4 | 13.54/86.46 | 34.3/65.7 |
| 5 | 14.80/85.20 | 28.0/72.0 |

EXAMPLE 2

An IPS Test Cell

Figure 1:
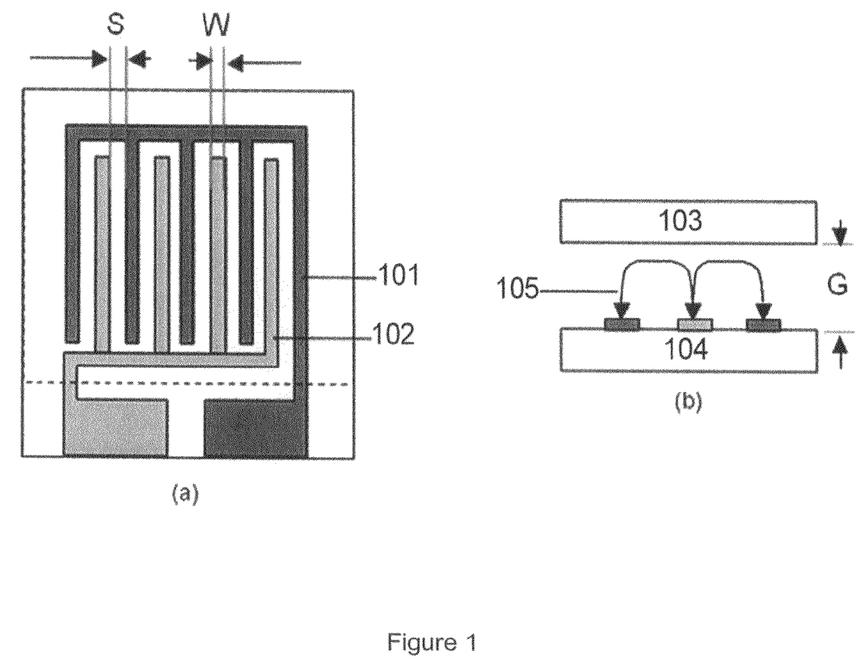
FIG. 1 schematically illustrates an IPS cell substrate with the electrode pattern in Panel (a) and the cross section of the cell in Panel (b), in accord with an embodiment of the invention.

One way to explore a BPLC material is to systematically investigate its physical, dielectric and electro-optical properties by varying the structure and configuration of a cell containing the BPLC. Electro-optical (EO) cells such as IPS test cells have been prepared without alignment layers and having substrates separated with glass spacers to obtain desired gaps such as 5 and 10 microns and electrode spaces and electrode widths such as 5, 7.5 and 10 microns. ITO-electrode coated glass substrates with inter-digitally patterned electrodes were prepared by photolithography. FIG. 1 schematically illustrates the IPS cell substrate with the electrode pattern in Panel (a) and the cross section of the cell in Panel (b). With reference to FIG. 1, the pixel electrode 101 and the counter electrode 102 are shaped as inter-digitized parallel bars on the lower substrate 104, and the bars of pixel electrode and the bars of the counter electrode are arranged in an alternative manner. The symbol "S" denotes the space between a pixel electrode bar and a neighboring counter electrode bar. The symbol "W" denotes the width of a counter electrode bar. The LC composition of Example 1 was confined in the space between the upper substrate 103 and the lower substrate 104. The symbol "G" denotes the gap between the upper substrate 103 and the lower substrate 104. An electrical field 105 may be generated between pixel electrode bars and counter electrode bars.

EXAMPLE 3

BPLC Microscopic Images

Figure 2:
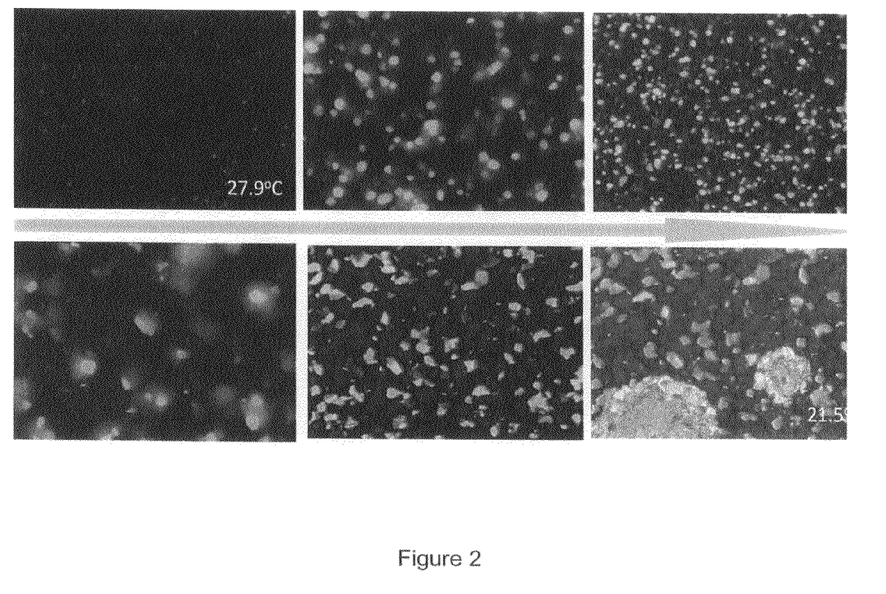
FIG. 2 is the microscopic images of a BPLC composition indicating the BP temperature range is about 21.5~27.9° C., in accord with an embodiment of the invention.

Microscopic Images of Samples 1-5 from Example 1 have been taken using a polarizing optical microscope (POM) and equipped with a hot stage and a computer controlled temperature controller at different temperatures. FIG. 2 is the microscopic images of sample 1 in Table 1. From the images, it can be concluded that the BP temperature range is about 21.5~27.9° C.

EXAMPLE 4

Blue Phase Temperature Ranges

Similarly to Example 3, all the samples from Example 1 have been measured and analyzed. The samples' blue phase temperature ranges are tabulated in Table 2.

TABLE 2

| Sample # | Blue phase temperature range (° C.) |
|---|---|
| 1 | 21.5~27.9 |
| 2 | 20.9~27.5 |
| 3 | 21.1~27.5 |
| 4 | 23.2~29.5 |
| 5 | 15.0~21.5 |

EXAMPLE 5

Field-induced Birefringence (FIB)

Field-induced birefringence in BPLCs has been studied in this Example using the sample 1 in Table 2. As known in the art, Kerr effect is expressed with an equation $\Delta n(E)=\lambda K E^2$, wherein K is the Kerr constant, $10^{-9}$~$10^{-10}$ $V^{-2}m$; $\Delta n$ is the induced birefringence, $\lambda$ is the wavelength used in the electro-optic measurement; and E is the applied electric field.

Figure 3A:
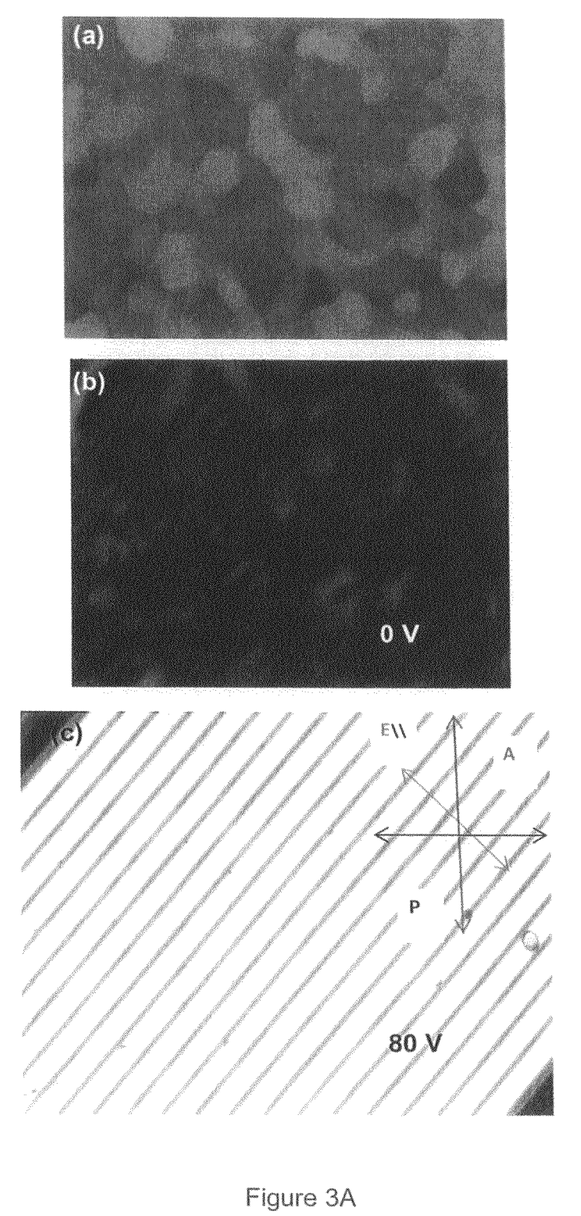
Figure 3B:
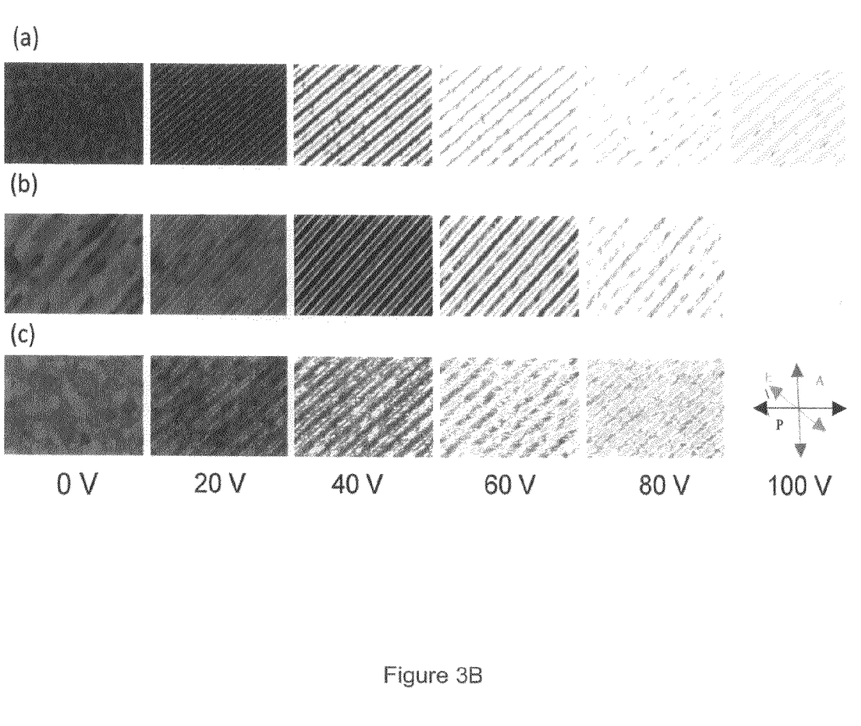
FIG. 3B shows the Polarizing Optical Microscopy (POM) images of IPS cells comprising a BPLC sample with (a) 5, (b) 10 and (c) 20 micron cell gap G under different applied voltages at room temperature, in accord with an embodiment of the invention.

The electro-optical (EO) properties of a BPLC (Sample #1 from Example 1) were investigated using an in-plane-switching (IPS) cell with 10 μm cell gap. The IPS has an inter-digitated electrode pattern (W=S=10 μm, i.e. 10 μm in width and space referring to FIG. 1) on one substrate but no electrode on the other substrate. The substrates of the IPS cells do not have alignment layers. The BPLC was loaded into the IPS cell. As shown in FIG. 3A-(a), the photomicrograph shows a BPI structure on a microscope slide at room temperature. The distinct textures of the BPLC in response to applied voltages of 0 and 80V in FIGS. 3A-(b) and 3A-(c) are reminiscent of field-induced birefringence. In FIG. 3A, the legend "E" represents direction of applied field and "P" and "A" are crossed polarizers. FIG. 3B shows the POM images of IPS cells comprising a BPLC (Sample #1 from Example 1) with (a) 5, (b) 10 and (c) 20 micron cell gap under applied voltage at room temperature. The electric field is at 45 degree between crossed polarizes.

EXAMPLE 6

Effect of Cell Gap and Pitch of Electrode

Figure 4A:
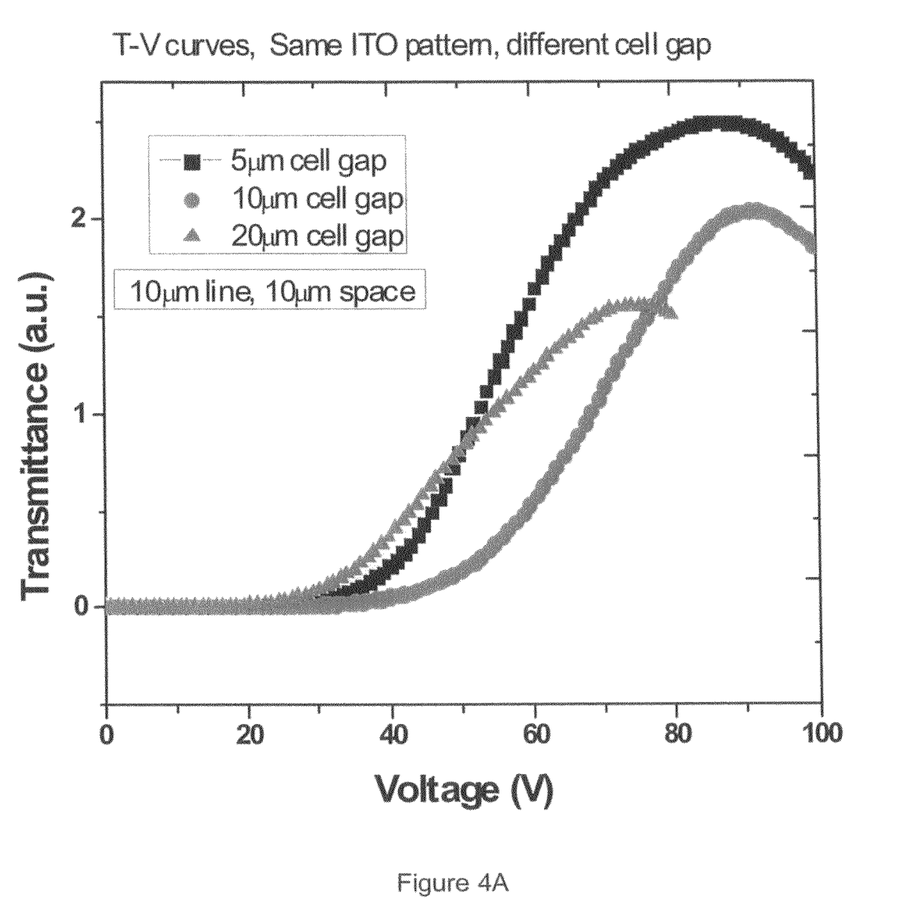
FIG. 4A shows the transmittance-voltage (T-V) curves of IPS cells with various cell gaps (5, 10 or 20 microns) and fixed electrode line spaces S and electrode line widths W of 10 microns, in accord with an embodiment of the invention.

Transmittance-Voltage (T-V) curves (i.e. plots of transmission versus applied voltage) were measured and plotted using a National Semiconductor Electro-optical module (a function generator, power amplifier, He—Ne laser ($\lambda$=632 nm), a pair of crossed-polarizers and a detector. The transmittance-voltage data recording was performed with an in-house developed software program. FIG. 4A shows the T-V curves of IPS cells with various cell gaps (5, 10 or 20 microns) and fixed S=W=10 microns. A BPLC (Sample #1 from Example 1) was loaded in the cells. As shown in FIG. 4A, the IPS cell with a 5 micron cell gap gives the best contrast between the field-on and field-off states. In addition, if a critical cell optimization has not been reached, the cell with 20 micron cell gap has the lowest threshold voltage among the three samples.

Figure 4B:
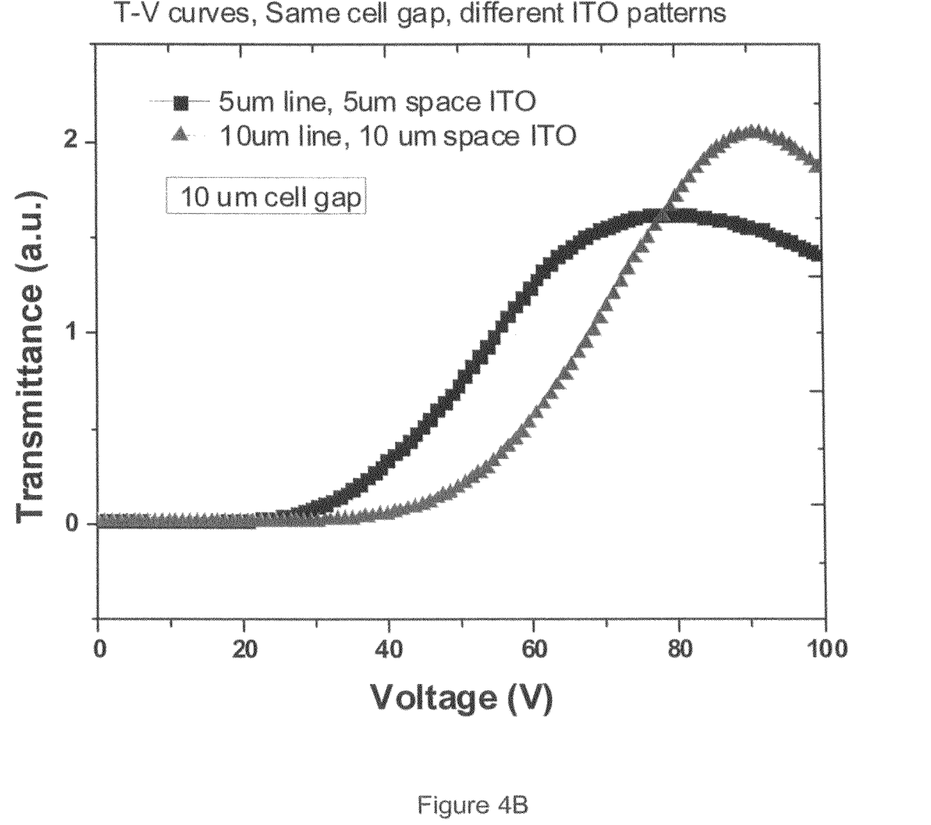
FIG. 4B shows the T-V curves of IPS cells comprising a BPLC sample with same cell gap but different electrode line spaces S and widths W, in accord with an embodiment of the invention.

FIG. 4B shows the T-V curves of IPS cells with the same cell gap but different electrode line spaces "5" and widths "W". A BPLC (Sample #1 from Example 1) was loaded in the cells. As shown in FIG. 4B, the cell with a small (5 μm) line space and electrode width has a low threshold voltage, while the cell with the 10 μm electrode line space and width has a high field-induced birefringence.

Figure 4C:
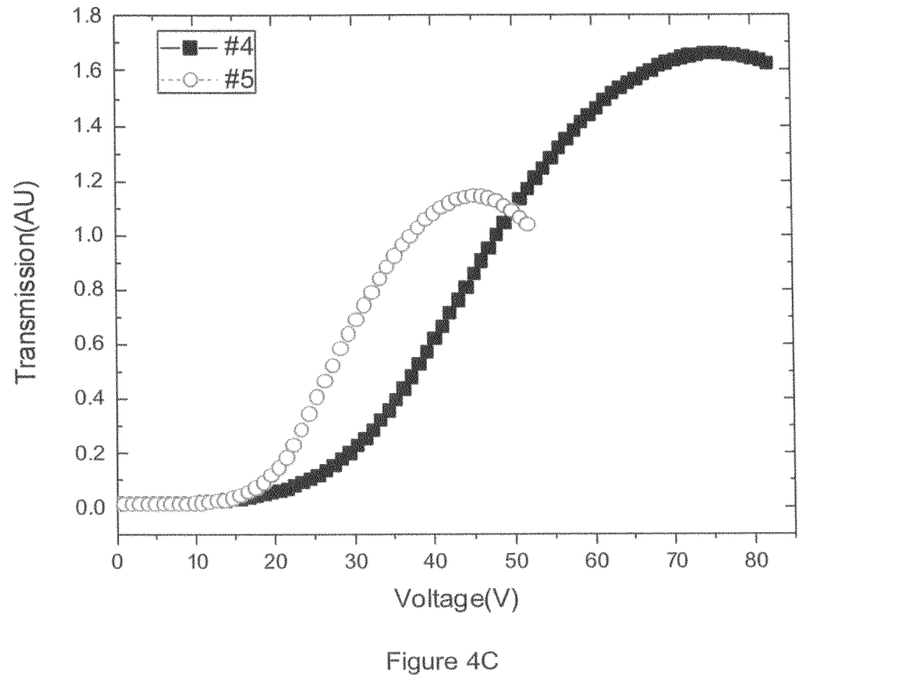
FIG. 4C shows the T-V curves of an IPS cell with 10 μm cell gap, 5 μm electrode line spaces and 5 μm electrode line widths, in accord with an embodiment of the invention.

FIG. 4C shows the T-V curves of an IPS cell with 10 μm cell gap, 5 μm electrode line spaces "5", and 5 μm electrode line widths "W". A BPLC (Sample 5 from Example 1) was loaded in the cells. The legend "#4" in FIG. 4C means cell #4; and the legend "#5" means cell #5. As shown in FIG. 4C, both the threshold (the voltage used to switch the cell to give 10% of light transmission) and turn on (the voltage used to switch the cell to give 90% of light transmission voltages) voltages of cell #5 is lower than those of the cell #4, indicating that a better electro-optical performance with the doping of C5PPTP2FNCS.

EXAMPLE 7

Effect of ITO Electrode Pattern

Figure 5A:
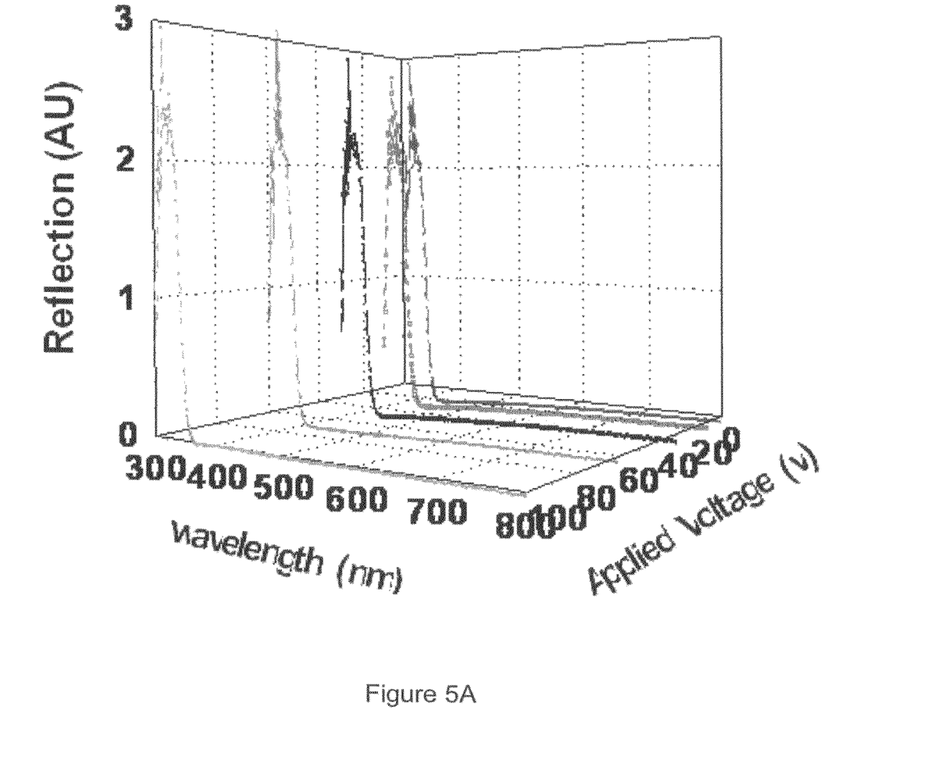
FIG. 5A shows plots of reflectance versus wavelength as a function of applied voltage of a BP mode cell, in accord with an embodiment of the invention.

The voltage dependence of the reflection spectrum was also measured with an Ocean Optics spectrometer, function generator and voltage amplifier. FIG. 5A shows plots of reflectance versus wavelength as a function of applied voltage of a BP mode cell showing a slightly blue shift in Bragg-reflected wavelength. As shown in FIG. 5A, the BP mode IPS cell with a 10 μm cell gap and 5 μM electrode line and space shows a Bragg reflected wavelength with a peak slightly below 400 nm at zero voltage for a typical BPLC formulation in Table 1 (Sample #1 from Example 1). Upon increasing the applied voltage, a blue-shift in Bragg reflected wavelength was observed. Interestingly, the reflectivity of the blue-shifted peak wavelength is independent of applied voltage.

Figure 5B:
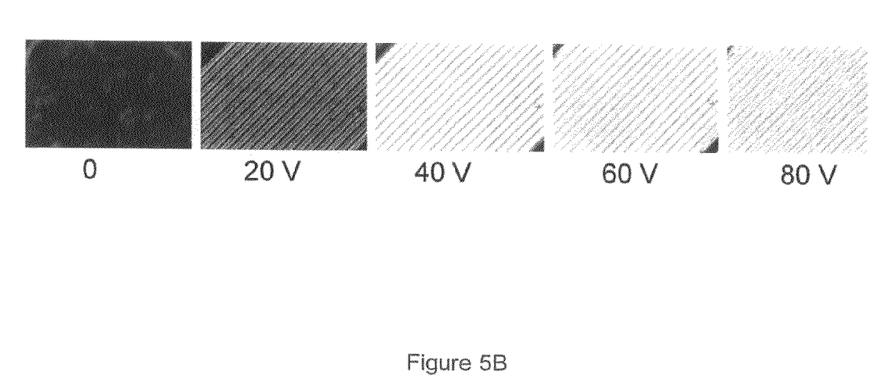
FIG. 5B demonstrates the distinct textures of POM images of IPS cells (G=10 μm and W=S=5 μm) comprising a BPLC sample in response to applied voltages of 0 and 80V, in accord with an embodiment of the invention.

Similar to FIG. 3A, FIG. 5B demonstrates the distinct textures of POM images of IPS cells (G=10 μm, and W=S=5 μm) comprising a BPLC (Sample #1 from Example 1) in response to applied voltages of 0 and 80V. At zero voltage, the BPLC cell shows the dark image of isotropic phase with the appearance of blue phase domains. With the applied voltage increases from 0V to 20V, the filed-induce birefringence increases and the cell appears a brighter blue color. The maximum transmittance was obtained with the applied voltage of 40V. Further increase in applied voltage results in extended birefringence where the light is rotated more than a half-wave plate.

EXAMPLE 8

Response Time and Threshold Voltages

Figure 6A:
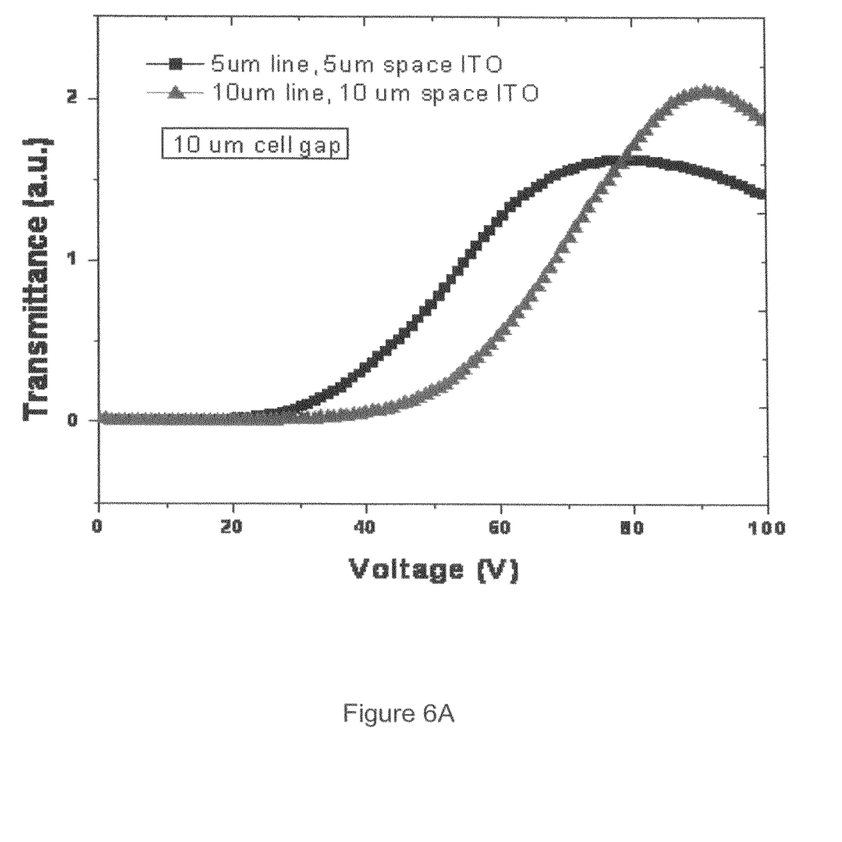
FIG. 6A shows the plot of transmission versus applied voltage of IPS cells with the same cell gap G but different electrode line space S and width W, in accord with an embodiment of the invention.

The effect of the ITO electrode pattern on the electro-optical properties was further investigated using IPS cells comprising a BPLC (Sample #1 from Example 1) with 10 micron cell gap. FIG. 6A shows the plot of transmission versus applied voltage of the IPS cells with the same cell gap G but different electrode line space S and width W. The cell with a small (5 μm) line space and electrode width has a low threshold voltage, while the cell with 10 μm electrode line space and width has a high field-induced birefringence.

Figure 6B:
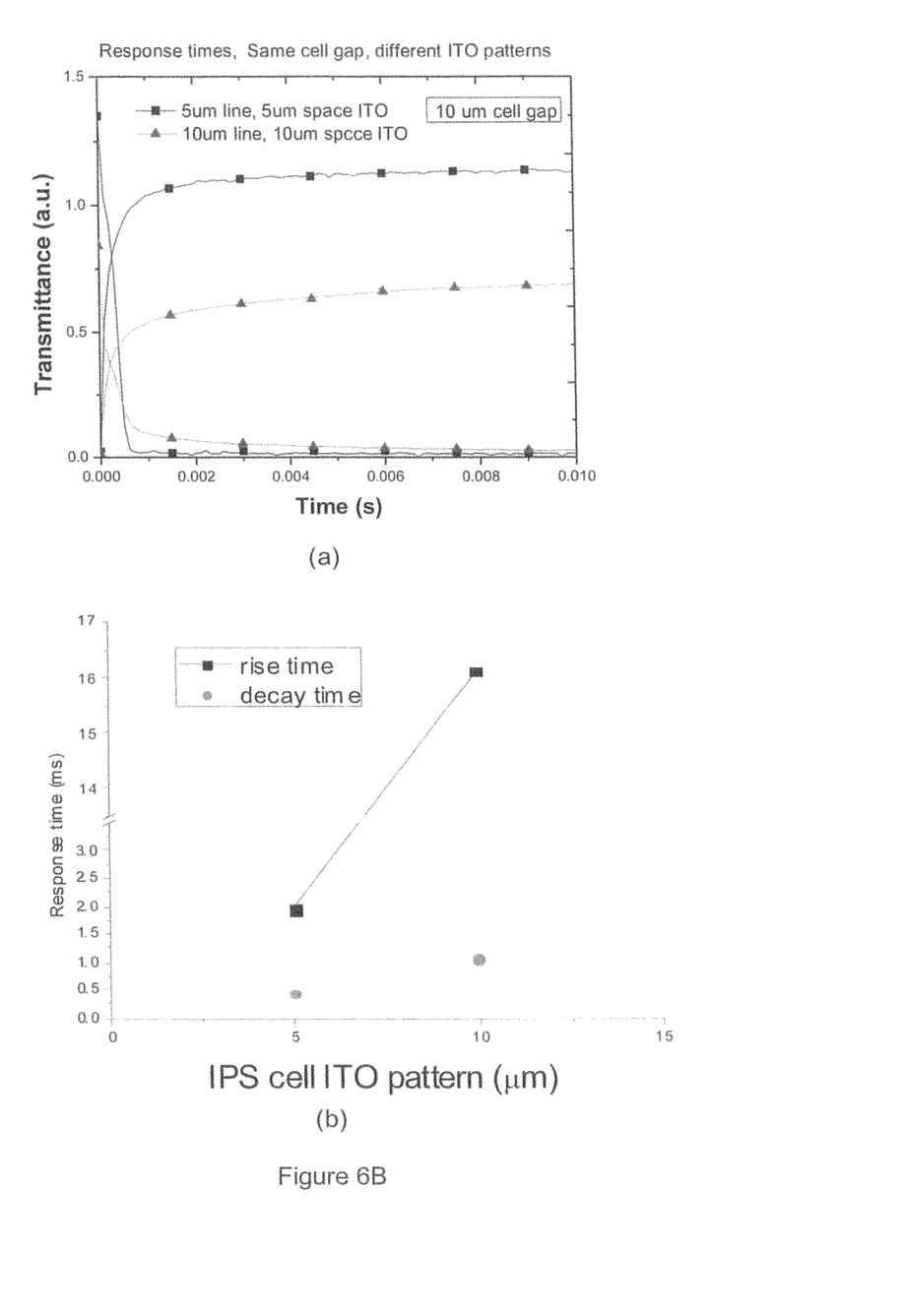
FIG. 6B shows the response times of an IPS cell with a fixed cell gap G but different electrode line spaces S and widths W, in accord with an embodiment of the invention.
Figure 6C:
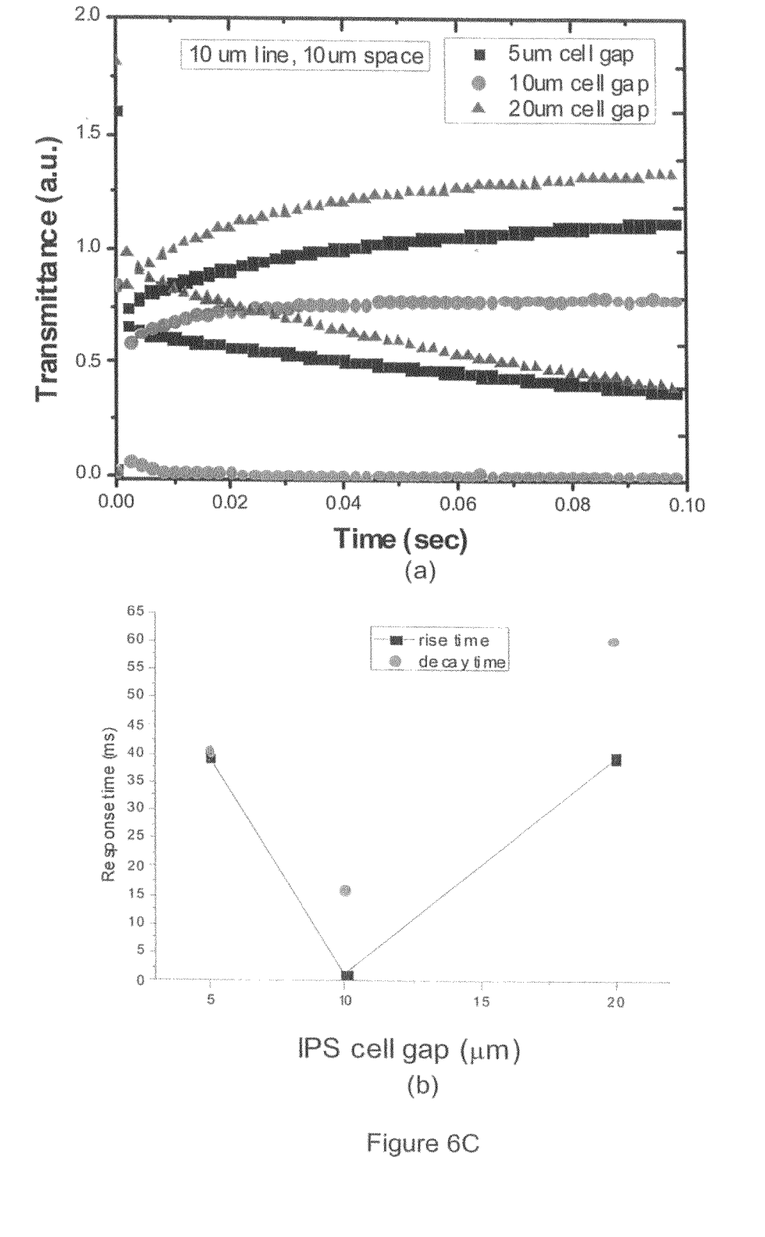
FIG. 6C shows the response times of an IPS cell with fixed electrode line space S and width W but different cell gaps G, in accord with an embodiment of the invention.

Response times were measured using the same electro-optical apparatus and method as described in Example 6. As shown in FIGS. 6B and 6C, the response time for the sample with a 5 micron electrode line space and width has a rise time of 450 μs and decay time 1.95 ms. The cell with 10 microns has a rise time of 1.07 ms and a decay time of 16.14 ms. In FIGS. 6B and 6C, the $V_{10}$ is the voltage required to switch the cell to achieve 10% light transmittance, $V_{90}$ is the voltage required to switch the cell to achieve 90% light transmittance, $\tau_{rise}$ is the time required to switch LC molecules parallel to the applied field and $\tau_{fall}$ is the time required for LC molecules relax back to their initial aligned state.

Figure 6D:
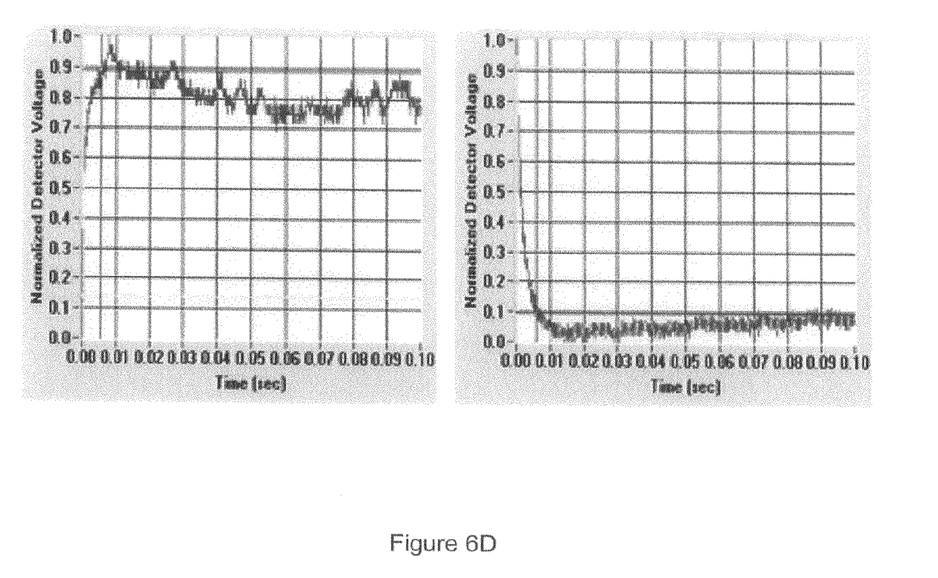
FIG. 6D demonstrates the response time of an IPS cell comprising a BPLC sample having an increased viscosity, in accord with an embodiment of the invention.

For another sample (Sample #5) from Example 1, FIG. 6D demonstrates the response time $t_{rise}$=4.9 ms, and $t_{fall}$=4.9 ms. The increase in response time may be due to the increase in viscosity from the high birefringence NLC additive. In theory, according to Paul R. Gerber, "Electro-optical effects of a small-pitch blue-phase system," *Molecular Crystals, Liquid Crystals,* 116, 197-206 (1985), equation [1] shows the response time of a blue phase, $$\tau_{BP} \cong \frac{\gamma P_o^2}{4\pi^2 K} \quad [1]$$

where γ is the rotational viscosity constant; K is the twist elastic constant; and $$P_o = \frac{1}{HTP*c} = \frac{1}{7.3*c} \approx 0.2 \ \mu m.$$

If we estimate γ~3Poise, K=4*$10^{-12}$N, than the response time is ~0.8 ms

Table 3 summarizes threshold voltages and response times for IPS cells with variation in cell gap and electrode pattern. According to the data, response time increases with the increase in cell gap. By reducing the line space and electrode width, the response time can be improved and the threshold voltage ($V_{th}$) of the IPS cell with BPLC can be reduced.

TABLE 3

| Sample Cell # | Electrode Pattern Line(μm)/ Space(μm) | Cell gap (μm) | $V_{10}$ (V) | $V_{90}$ (V) | $\tau_{rise}$ (ms) | $\tau_{fall}$ (ms) | $\tau_{Total}$ (ms) |
|---|---|---|---|---|---|---|---|
| 1 | 10/10 | 4.75 | 41.18 | 71.3 | 39.5 | 40.5 | 80.0 |
| 2 | 10/10 | 20 | 36.62 | 65.4 | 39.5 | 60.4 | 99.9 |
| 3 | 10/10 | 10 | 50.79 | 83.0 | 1.07 | 16.14 | 16.2 |
| 4 | 5/5 | 10 | 34.51 | 65.4 | 0.45 | 1.95 | 2.40 |
| 5 | 5/5 | 10 | 20.2 | 38.2 | 4.90 | 4.90 | 9.60 |

The room-temperature BPLC enables low switching voltage, fast response time and high optical contrast based on IPS mode cells. The response time increases with the increase in cell gap. By reducing the line space and electrode width, one is able to improve the response time and reduce the threshold voltage of the IPS cell with BPLC. The switching voltage is typically around 6 V/μm, and the response time is ultrafast ~450 μs.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A liquid crystal composition comprising (i) a mixture of two or more nematic liquid crystals selected from the group consisting of an isothiocyanate and fluorinated isothiocyanate LC, BL006, MLC 6080, and ZLI 4792, and (ii) at least one chiral dopant; wherein the mixture of liquid crystals is in a blue phase and each of the two or more nematic liquid crystals has a dielectric anisotropy in the range of from about −10 to about +30, an optical birefringence in the range of from about 0.05 to about 0.5, and a viscosity in the range of from about 90 mPa·s to about 450 mPa·s.

2. A liquid crystal composition comprising (i) a mixture of two or more nematic liquid crystals comprising an isothiocyanate and fluorinated isothiocyanate LC, and BL006, and (ii) at least one chiral dopant; wherein the mixture of liquid crystals is in a blue phase and each of the two or more nematic liquid crystals has a dielectric anisotropy in the range of from about −10 to about +30, an optical birefringence in the range of from about 0.05 to about 0.5, and a viscosity in the range of from about 90 mPa·s to about 450 mPa·s.

3. The liquid crystal composition according to claim 2, in which the mixture comprises C5PPTP2FNCS and BL006.

4. The liquid crystal composition according to claim 3, in which the weight ratio between C5PPTP2FNCS and BL006 is in the range of from about 0.05 to about 99.95.

5. A liquid crystal composition comprising (i) a mixture of two or more nematic liquid crystals, and (ii) at least one chiral dopant;
   wherein the mixture of liquid crystals is in a blue phase and
      each of the two or more nematic liquid crystals has a dielectric anisotropy in the range of from about −10 to about +30, an optical birefringence in the range of from about 0.05 to about 0.5, and a viscosity in the range of from about 90 mPa·s to about 450 mPa·s, in which the mixture of two or more nematic liquid crystals and the at least one chiral dopant have a weight ratio in the range of from about 0.3 to about 0.6.

6. A liquid crystal composition comprising (i) a mixture of two or more nematic liquid crystals, and (ii) at least one chiral dopant; wherein the mixture of liquid crystals is in a blue phase and each of the two or more nematic liquid crystals has a dielectric anisotropy in the range of from about −10 to about +30, an optical birefringence in the range of from about 0.05 to about 0.5, and a viscosity in the range of from about 90 mPa·s to about 450 mPa·s, in which the mixture comprises C5PPTP2FNCS and BL006; and the at least one chiral dopant comprises CB15.

7. A liquid crystal cell comprising two substrates, a layer of polymer, and a liquid crystal composition comprising (i) a mixture of two or more nematic liquid crystals, and (ii) at least one chiral dopant; wherein the mixture of liquid crystals is in a blue phase, the liquid crystal composition is placed between the two substrates and secured within the layer of polymer.

8. The liquid crystal cell according to claim 7, wherein the layer of polymer prevents ions from substrate diffusing into the liquid crystal composition.

9. The liquid crystal cell according to claim 7, which has no alignment layer.

10. The liquid crystal cell according to claim 7, which is an in-plane switching (IPS) cell comprising a pixel electrode and a counter electrode on one of the two substrates, wherein at least a part of the pixel electrode and at least a part of the counter electrode are shaped as inter-digitized parallel bars, and the bars of pixel electrode and the bars of the counter electrode are arranged alternatively.

11. The liquid crystal cell according to claim 10, wherein the gap between the two substrates is in the range of from about 2 μm to about 20 μm; the width of the bars of the counter electrode is in the range of from about 5 μm to about 50 μm, and the distance between a bar of the pixel electrode and a neighboring bar of the counter electrode is in the range of from about 5 μm to about 100 μm.

12. A liquid crystal device comprising one or more cells according to claim 7.

13. The liquid crystal device according to claim 12, which is selected from a liquid crystal display, a phase modulator, a beam steering device, a sensor, and a lasing device.

14. A liquid crystal composition, comprising (i) a mixture comprising isothiocyanate and fluorinated isothiocyanate LC, and BL006, and (ii) at least one chiral dopant; where the mixture of liquid crystals is in a blue phase.

15. A liquid crystal composition, comprising (i) a mixture comprising C5PPTP2FNCS and BL006, and (ii) at least one chiral dopant; where the mixture of liquid crystals is in a blue phase.

\* \* \* \* \*